(12) United States Patent
Whitsell

(10) Patent No.: US 7,203,598 B1
(45) Date of Patent: Apr. 10, 2007

(54) TRAFFIC INFORMATION AND AUTOMATIC ROUTE GUIDANCE

(75) Inventor: Sean M. Whitsell, Durham, NC (US)

(73) Assignee: Nortel Networks Limited, St. Laurent (CA)

( * ) Notice: Subject to any disclaimer, the term of this patent is extended or adjusted under 35 U.S.C. 154(b) by 1291 days.

(21) Appl. No.: 09/670,152

(22) Filed: Sep. 26, 2000

(51) Int. Cl.
*G01C 21/30* (2006.01)
*G06G 7/76* (2006.01)

(52) U.S. Cl. .............. 701/210; 701/200; 701/117; 340/988; 342/357.01; 342/357.08

(58) Field of Classification Search ........ 701/208–210, 701/213–214, 117–119, 24–26, 200–202; 342/357.01, 357.9, 357.1, 357.09, 357.08; 340/988
See application file for complete search history.

(56) References Cited

U.S. PATENT DOCUMENTS

| | | | | |
|---|---|---|---|---|
| 5,612,881 A | * | 3/1997 | Moroto et al. | 701/209 |
| 6,049,753 A | * | 4/2000 | Nimura | 701/201 |
| 6,125,323 A | * | 9/2000 | Nimura et al. | 701/207 |
| 6,615,134 B2 | * | 9/2003 | Ando | 701/209 |
| 6,707,421 B1 | * | 3/2004 | Drury et al. | 342/357.1 |
| 6,807,423 B1 | | 10/2004 | Armstrong et al. | 455/440 |
| 2001/0001848 A1 | * | 5/2001 | Oshizawa et al. | 701/210 |

\* cited by examiner

*Primary Examiner*—Y. Beaulieu
(74) *Attorney, Agent, or Firm*—Withrow & Terranova, PLLC

(57) ABSTRACT

A traffic information system includes a traffic information server linked to a mobile terminal via a supporting wireless communications network. The traffic information system provides traffic information pertaining to a learned route of travel to a user of the mobile terminal when it is recognized that the user is likely traveling or is likely to travel on the learned route of travel. Routes of travel are learned based on tracking the location of the mobile terminal while traveling a specific route of travel, or over time to identify commonly traveled routes. Recognizing that the user is traveling on or is about to travel on a learned route may entail recognizing that a current time matches a customary travel time for the learned route. Alternatively, or in combination, such recognition may entail recognizing that a current location of the mobile terminal matches a location associated with the learned route.

36 Claims, 9 Drawing Sheets

TRAFFIC INFORMATION AND AUTOMATIC ROUTE GUIDANCE

FIELD OF THE INVENTION

The present invention relates to traffic information systems and particularly relates to providing route-specific travel information to a vehicle operator.

BACKGROUND OF THE INVENTION

Traffic jams and general traffic congestion are chronic problems faced by millions of motorists every day. Motorists waste untold hours sitting in traffic, resulting in lost earnings, missed appointments, lost leisure time, personal stress, and a myriad of other deleterious effects. Not surprisingly, modern societies expend significant effort in attempts to alleviate traffic problems, or at least to mitigate their effects.

Mass transit, whether comprising bus or light-rail public transportation, represents a direct strategy for alleviating vehicular traffic problems through reducing the number of vehicles on the road. While this is a meritorious approach, mass transit simply cannot provide the convenience and versatility of individualized transportation. Thus, the reign of the automobile is not yet seriously threatened by public transportation and the number of vehicles on modern roads ever increases. Other approaches to traffic control relate directly to vehicles on the road and seek to manage traffic flow based on current traffic information.

Generally, approaches to direct traffic management involve the use of so-called intelligent traffic systems (ITS) or advanced traveler information services (ATIS). Real-time traffic information is a key enabling technology for these types of systems, and oftentimes comprises a regional database of continuously updated traffic conditions. Of course, such information is of little value unless it is readily accessible to motorists in a manner that allows them to make meaningful route decisions. Real-time traffic information may be collected through the use of roadside cameras, monitoring helicopters, or by other electronic monitoring techniques.

One example of an alternate traffic monitoring technique relies on actively monitoring cell phone activity. In this system, wireless communications service providers track the location of motorists via radio signals emitted from active cellular telephones. Statistical methods are then used to estimate the number of actual motorists on a given route. Various approaches exist for providing this information to motorists; with common examples including roadside information signs and radio broadcast traffic information. However, with the advent of in-car navigation systems and the near ubiquitous nature of cellular telephones, more sophisticated opportunities exist for providing real-time traffic information to motorists.

Indeed, some prototype traffic management systems include two-way communications between a traffic information center and an automobile or other moving vehicle. Information received from the traffic information center may be used by the motorist to make decisions about selected routes of travel. In one example, in-car navigation systems combine stored map information with real-time traffic data to provide suggested or alternate routes to motorists. Real-time traffic information may be received and used in conjunction with an in-vehicle navigation system. While such systems provide advantages to motorists, dedicated navigation systems entail significant cost and complexity, and are oftentimes available for direct purchase only from vehicle manufacturers. Other complications arise based on the necessity of the motorist to actively detail intended routes of travel, or at least identify specific origins and destinations to such systems before being provided with meaningful route-specific travel information.

Ideally, advanced traffic information systems will capitalize on more commonly available electronic devices, such as cellular telephones and wireless personal digital assistants. Such devices have achieved enormous market penetration in developed countries, and therefore represent commonplace communication appliances. Further, such communication appliances represent ideal components for traffic flow management because (1) they are inherently designed for two-way communications and can easily receive real-time or near real-time traffic information from a traffic management center; (2) such devices are based on wireless communication networks that allow reasonably precise device location; and (3) such devices are affordable and enormously popular. However, there are concerns with any system based on such wireless devices.

First, the systems must be effective in that they provide meaningful information to individual motorists so that intelligent decisions may be made with regard to specific routes of travel. Generalized information about major traffic snarls and accidents is of little value to individual motorists if they are unaware of what alternate routes of travel might allow them to avoid traffic congestion while still maintaining a viable route to their intended destination. Secondly, traffic information systems must be easy use; otherwise motorists will be unable to obtain full benefit of the real-time traffic information provided by associated traffic management centers. Importantly, ease-of-use translates into greater safety. Already, distraction associated with normal wireless communication device use while driving is the subject of significant safety concerns. Thus, minimizing the interaction between a motorist and a wireless communication device while driving is essential. Third, costs associated with providing useful real-time traffic information to motorists must be minimized, and upgrading to systems capable of providing traffic information will ideally complement existing electronic systems.

Accordingly, there remains a need for simplified, inexpensive, and safe approach to providing real-time traffic information to motorists. Despite a wide variety of existing traffic information systems, whether fielded in actual use or simply existing as prototypes, no solution to date provides convenient and safe techniques for motorists to receive relevant traffic information. Further, existing systems do not offer affordable upgrades to conventional consumer electronic devices, such as mobile wireless terminals, that result in safe, easy-to-use traffic information systems.

SUMMARY OF THE INVENTION

The present invention provides an inexpensive, safe and convenient approach to providing real-time traffic and navigation guidance information to motorists. Wireless communication devices, such as cellular telephones or personal digital assistants, cooperate with associated wireless communication networks and a traffic information center to provide route- and location-specific traffic information. In the system of the present invention, such mobile devices are used to learn commonly traveled routes by periodically monitoring and recording location and, optionally, corresponding time-of-day information. Thus, a mobile device associated with a given motorist or vehicle can be used to develop a record of traveled routes, possibly with associated travel times and destination information, for that motorist.

Thereafter, current time and/or location information may be used to access travel records associated with a given motorist to identify a most likely current route or destination for that motorist. This information may be used to query a traffic information database for pertinent route or destination traffic information. A traffic information center returns relevant traffic information, and the mobile device provides the motorist with appropriate warnings or alternate route suggestions if needed. Depending upon indicated traffic conditions, the present invention may provide motorists with alternate route guidance. The need for alternate route guidance may be evaluated based on user-configurable settings regarding undesirable traffic conditions.

In the system of the present invention, the traffic information center may include a traffic information server and an associated traffic information database that is continuously updated with real-time or near real-time traffic information. Associated wireless communications devices may be linked with the traffic information center through wireless communication networks, such as those used by cellular and paging service providers. Because the traffic information requests for an individual motorist may be made based on most likely routes or destinations as determined from learned travel information, vehicle operators are alleviated from having to interact with the mobile device to initiate access to such information under normal circumstances. This obviates the need for the motorists to explicitly tell the system where they are going and by what route they intend to travel.

Additionally, the present invention accommodates both user-commanded route learning and explicit route and destination designations input by the mobile device users. The ability to query the traffic information database for relevant route and destination information without undue interaction from the vehicle operator enhances safety-of-use and marks a significant simplification in the way drivers interact with and use real-time traffic information systems.

Processing traffic information, recording and analyzing travel patterns, forming route-specific traffic information queries, and providing alternate route information when necessary, may be performed by the mobile devices themselves, the supporting wireless communications network, the traffic information server, or any combination thereof. Preferably, the mobile devices are adapted to learn travel patterns, transmit traffic information queries, process received traffic information, provide traffic warnings, and route information as needed, or a combination thereof.

As such, the traffic information server receives traffic information requests from various mobile devices through the supporting wireless communications network and uses the route or destination information contained in those requests to query the traffic information database for pertinent traffic information. This traffic information is then sent back to the requesting mobile devices by the traffic server through the wireless communications network. In such embodiments, the mobile devices preferably include some form of electronic "smart card" or other modular electronic assembly that may be optionally attached to or integrated with the mobile device to impart the required functionality.

So equipped, such mobile devices may periodically monitor and record location and time information such that they build a cumulative record of commonly traveled routes and associated times of travel. This information may then be used in conjunction with real-time traffic information received from associated traffic information centers to provide motorists with traffic warnings and suggested alternate routes of travel. Most-likely route and/or destination information is used to form a traffic information query that is sent via wireless communications to an associated traffic information center, where the information is processed to develop a response message specific to the motorist's route of travel and destination. The mobile device receives this information and indicates any pending traffic problems to the motorist. Depending upon the severity of indicated traffic problems, the traffic information system may suggest alternate routes of travel based either on stored information, or on information received from the traffic information center.

Other aspects and features of the present invention will become apparent to those ordinarily skilled in the art upon review of the following description of specific embodiments of the invention in conjunction with the accompanying figures.

DETAILED DESCRIPTION OF THE INVENTION

Figure 1:
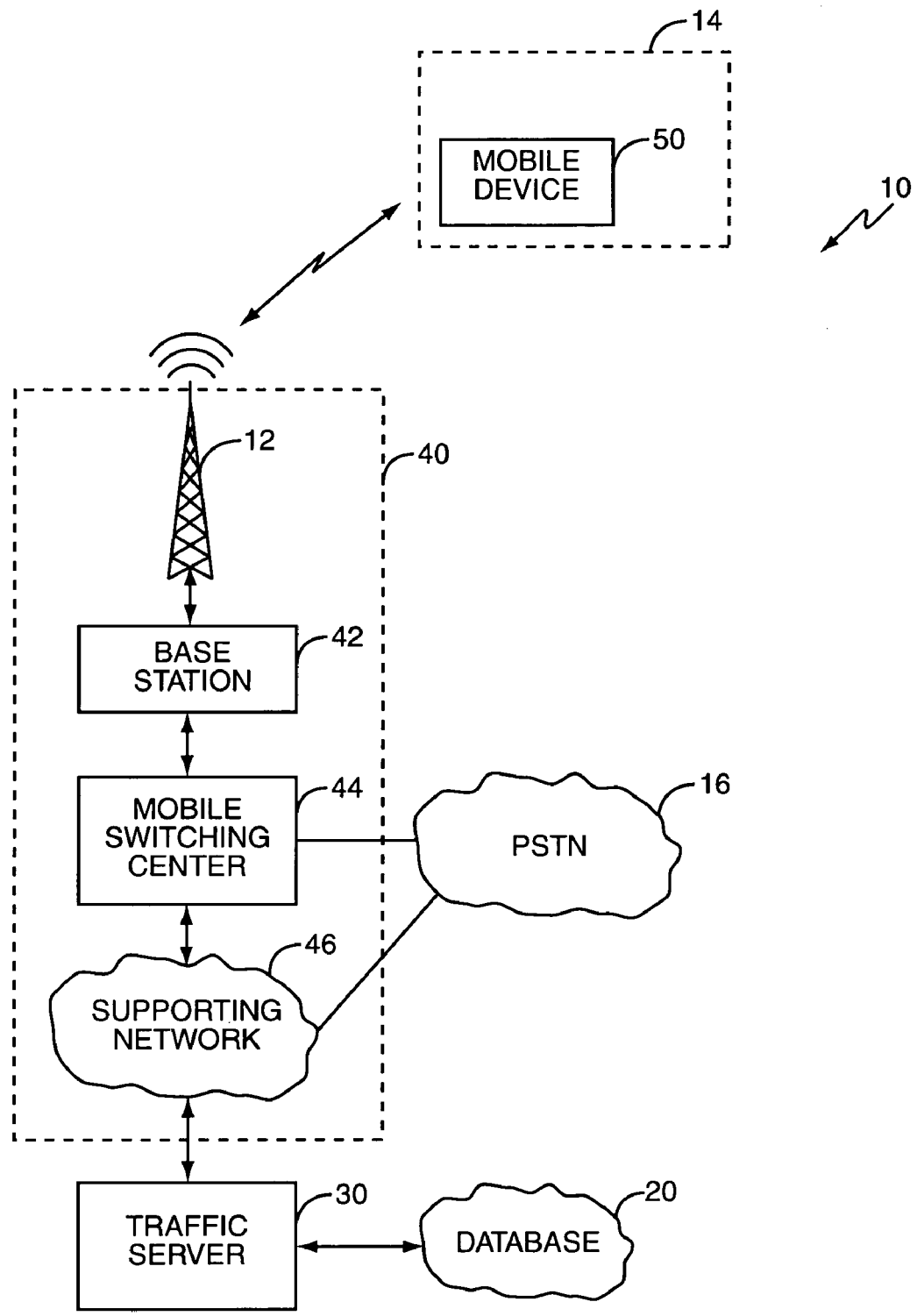
FIG. 1 illustrates an exemplary traffic information system for practicing the present invention.

FIG. 1 illustrates an exemplary system for practicing one embodiment of the present invention. A traffic information system 10 includes a near real-time or real-time traffic information database 20 that contains frequently updated traffic information for one or more geographic regions. A traffic information server 30 provides an intelligent interface to the traffic information database 20, and is capable of extracting specific information from the database 20 based on receiving traffic information queries, or forming such queries itself.

The traffic information server 30 may also serve as a gateway between the database 20 and traffic information resources used to update real-time traffic information. A wireless communications network 40 links the traffic information server 30 to one or more mobile terminals 50. To utilize the present invention, each mobile terminal 50 is associated with or carried at least part of the time in a vehicle 14. Details of the wireless communications network 40 may vary substantially. FIG. 1 illustrates an exemplary wireless network including one or more communication towers 12, one or more base stations 42, one or more mobile switching centers 44, and supporting network(s) 46. The supporting network 46 may represent an interconnection to other communication networks, such as the Internet, or may simply provide an interface between the wireless communications network 40 and other processing systems, such as the traffic information server 30.

In a cellular telephone or wireless paging environment, the wireless communications network 40 typically provides a base station 42 to translate communication signals received from the mobile switching center 44, perhaps from outside networks like the Public Switched Telephone Network 16 (PSTN), into wireless signals suitable for transmission to the mobile terminal 50 through the communications tower 12. Similarly, the base station 42 converts wireless signals received from mobile terminals 50 through the communications tower 12 into communication signals suitable for relay to the mobile switching center 44. The supporting network 46 can link multiple mobile switching centers 44 together with the traffic information server 30. Many variations exist for linking the wireless communications network 40 with the traffic information server 30, and can include various network interconnections, such as through the PSTN or the Internet. Alternatively, the functionality of the traffic information server 30 may be integrated within the various processing and information systems comprising the wireless communications network 40.

Preferably, each mobile terminal 50 is associated with a given vehicle 14 and motorist (not shown). Of course, the mobile terminal 50 may be removable from the vehicle 14, and may be associated with more than one vehicle 14. In operation, a plurality of mobile terminals 50, each associated with a particular vehicle 14, cooperate with the traffic information server 30 and wireless communications network 40 to provide individual motorists operating respective ones of vehicles 14 with essentially real-time traffic information. This information is obtained from the traffic information database 20. Particular details of this operation will be explained more fully later.

Figure 2:
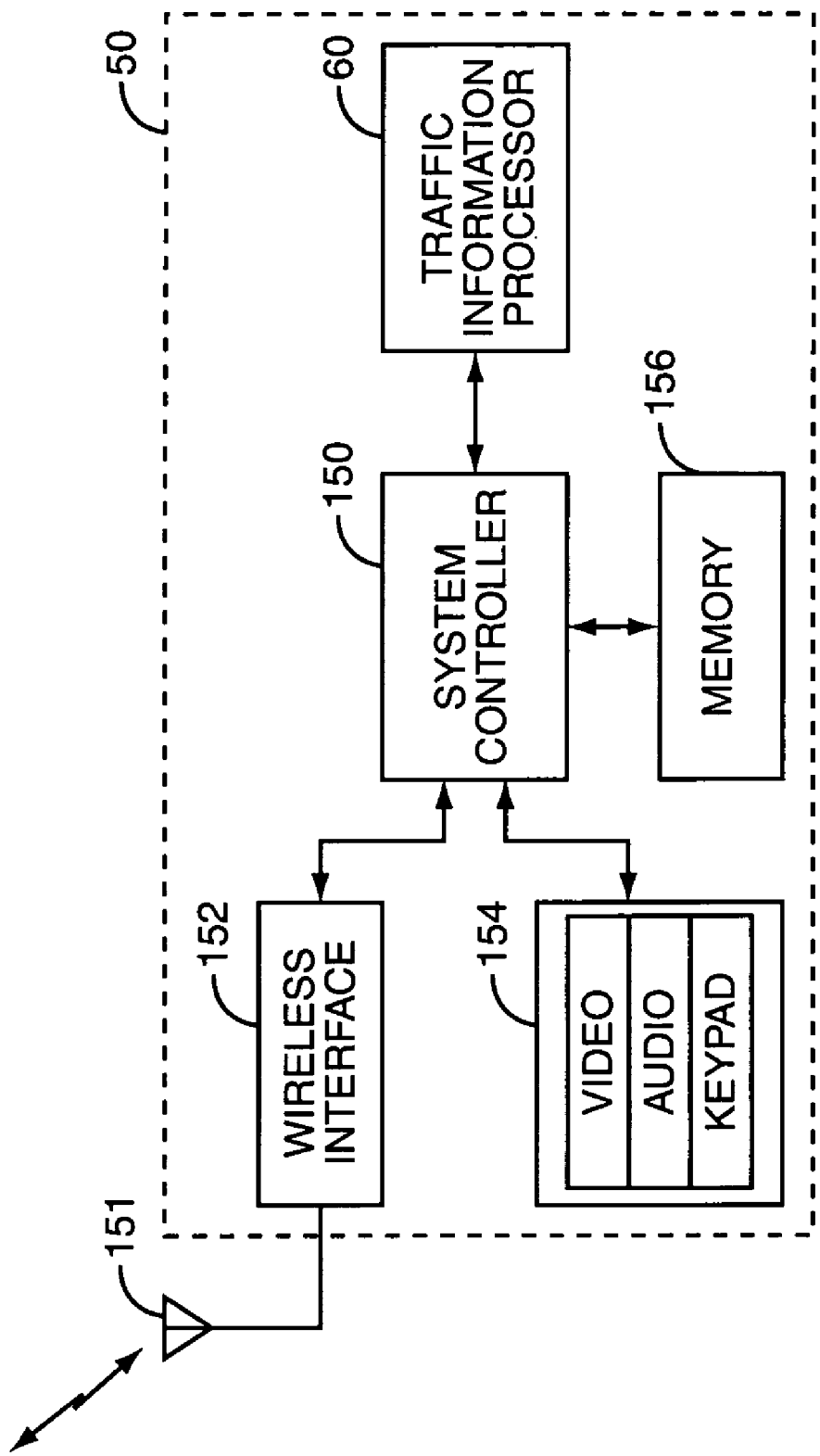
FIG. 2 is a simplified block diagram of an exemplary wireless communications device that may be used in the system of FIG. 1.

FIG. 2 provides a simplified illustration of one embodiment for a mobile terminal 50 suitable for use in the present invention. The mobile terminal 50 includes a communications antenna 151 for transmitting and receiving wireless information to and from the wireless communications network 40. Note that in practical implementations, the mobile terminal 50 will likely be a cellular telephone, analog or digital, or one of any number of personal communication devices, such as two-way pagers and wireless personal digital assistants (PDAs).

Common to all such devices is the inclusion of a wireless interface 152 adapted to transmit and receive wireless information, a user interface 154 that typically includes a visual display, some form of audio input and output, and some type of command entry device, such as a keypad. This allows a user of the mobile terminal 50 to interact with and control the mobile terminal 50, and to engage, for example, in voice or data communications with a remote party. The user interface 154 is ideal for providing traffic information to a motorist.

A system controller 150 in cooperation with a memory 156 provides overall communications and operations control for the mobile terminal 50, and may include a number of associated controllers or control circuits. For example, digital cellular telephones oftentimes include both digital signal processors and more conventional microcontrollers to handle communications signaling and voice processing in tandem with user interface control and power management. A traffic information processor 60 supplements the basic operation of the mobile terminal 50 and enables at least a portion of the functionality embodied by the present invention.

Preferably, the traffic information processor 60 is made available as an accessory to the basic mobile terminal 50. However, this preferred implementation for the traffic information processor 60 should not be construed as limitation of the present invention. Indeed, the functionality embodied by the traffic information processor 60 may be fully integrated into the functional circuitry of the mobile terminal 50 where practical and appropriate.

In operation, the traffic information processor 60 provides the mobile terminal 50 with a number of features related to providing motorists with traffic and route information. Fundamentally, the traffic information processor 60 enables the mobile terminal 50 to send traffic information queries to the traffic information server 30 via the wireless communications network 40 and process traffic information received in response. Additionally, the traffic information processor 60 may include operating software and supporting circuitry that enables the mobile terminal 50 to "learn" the routes traveled by the owner of a given mobile terminal 50. In the basic concept, the traffic information processor 60 records location information optionally with time information such that, over time, clear patterns of travel may emerge. Subsequently, when a given motorist is traveling in a vehicle with an associated mobile terminal 50, the traffic information processor 60 uses current location and/or time information to predict the most likely route of travel and, possibly, the most likely destination for the motorist.

The traffic information processor 60 uses this information to form a traffic information query that is transmitted by the mobile device to the traffic information server 30. Traffic information queries may include specific route information and allow the traffic information system 10 to retrieve pertinent traffic information from the traffic information database 20. Processing query results may occur at the traffic information server 30, or may occur in the traffic information processor 60 included in the mobile terminal 50. Details regarding how much traffic information is processed by the traffic information server 30 or by the traffic information processor 60 in the mobile terminal 50 are a function of system bandwidth and cost considerations.

Figure 3:
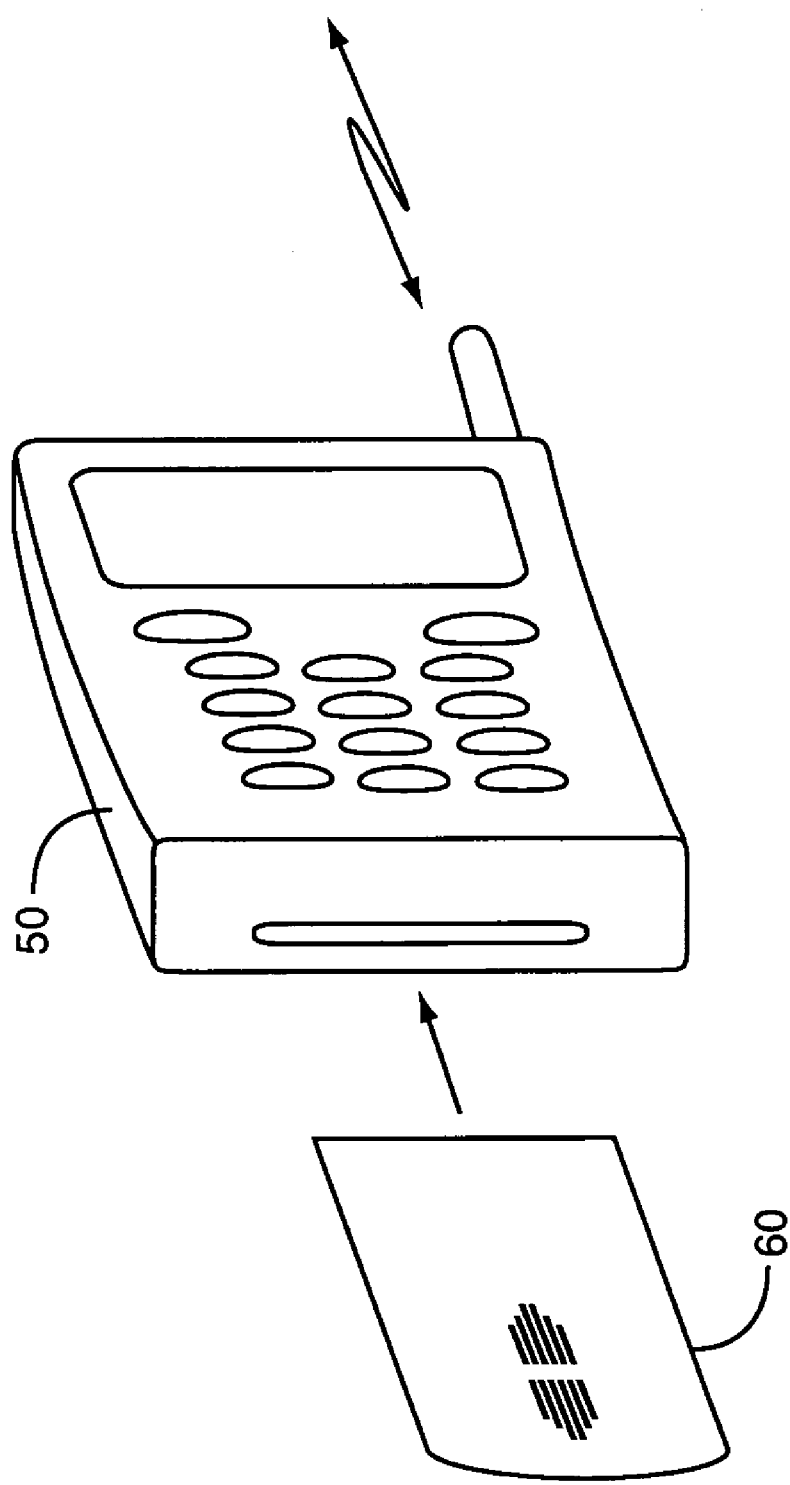
FIG. 3 illustrates an exemplary embodiment for the wireless communications device of FIG. 2.

FIG. 3 illustrates an exemplary smart card embodiment for the traffic information processor 60. As illustrated, the smart card 60 may be used as an accessory to the basic mobile communications device 50. Preferably, the smart card embodiment of the traffic information processor 60 includes processing and storage capability sufficient to support a Java Applet designed to learn travel routes and communicate with the traffic information server 30. However, it should be understood that the traffic information processor 60, or like functional equivalents thereof, may be implemented in a variety of forms, and may include software in any machine or computer language.

The present invention does not require that the traffic information processor 60 be in the form of a smart card. Indeed, the present invention does not require that the traffic information processor 60 be separate from the circuitry of the mobile terminal 50. For example, the functionality of the traffic information processor 60 could be incorporated into the system controller 150. However, implementation of the traffic information processor 60 as a smart card allows it to be used more conveniently as an "upgrade" to existing communication devices 50.

While many variations of smart cards exist and are suitable for usage in the present invention, exemplary embodiments are based on a standard promulgated by Sun Microsystems, Inc., having a business address of 901 San Antonio Road, Palo Alto, Calif. 94303, USA, under the trade name JAVA CARD. Various specification documents related to the JAVA CARD are included in the JAVA CARD documentation bundle referred to as the "JAVA CARD 2.11 Platform Documentation," the entirety of which is incorporated herein by reference. This incorporated documentation includes the Java Card 2.1.1 API Specification, the Java Card 2.1.1 Runtime Environment (JCRE) Specification, the Java Card 2.1.1 Virtual Machine (JCVM) Specification, and the Java Card 2.1.1 Specification Release Notes.

Note that basic information related to industry-standard smart cards may be obtained from the Smart Card Industry Association, a global trade association having a business address of 191 Clarksville Road, Princeton Junction, N.J. 08550, USA. Various documents of interest include the International Standards Organization (ISO) standard for basic contact smart cards, ISO 7816 series, part 1-10, and contactless card standards defined by the ISO 14443 standard, with these standards incorporated herein by reference.

The smart card embodiment of traffic information processor 60 allows consumers to economically upgrade existing personal communication devices with desired traffic information and route guidance capabilities. In smart card form, the traffic information processor 60 preferably includes software or computer readable media comprising software instructions embodying at least some of the required functionality of the present invention. This functionality may include the route learning capability, and traffic information controller querying capability. Additionally, the traffic information processor 60 must cooperate with the remaining circuitry comprising the mobile terminal 50 such that it is responsive to user input through user interface 154, and such that it cooperates with the system controller 150 to make full use of the wireless communications capability of the mobile terminal 50.

The traffic information processor 60 may further include the ability to determine its own location based on triangulating signals received from geographically dispersed communication towers 12 associated with the wireless communications network 40. Depending upon the capabilities of the wireless communications network 40 supporting the traffic information server 30, the wireless network 40 may itself determine the location of a given mobile terminal 50, based on monitoring signals transmitted from the given mobile terminal 50 as received through a number of geographically disperse communication towers 12. Optionally, the traffic information processor 60 may forego native ability to determine the present location of the mobile terminal 50. In this case, the mobile terminal 50 may receive location information from an external, associated navigational device.

Figure 4:
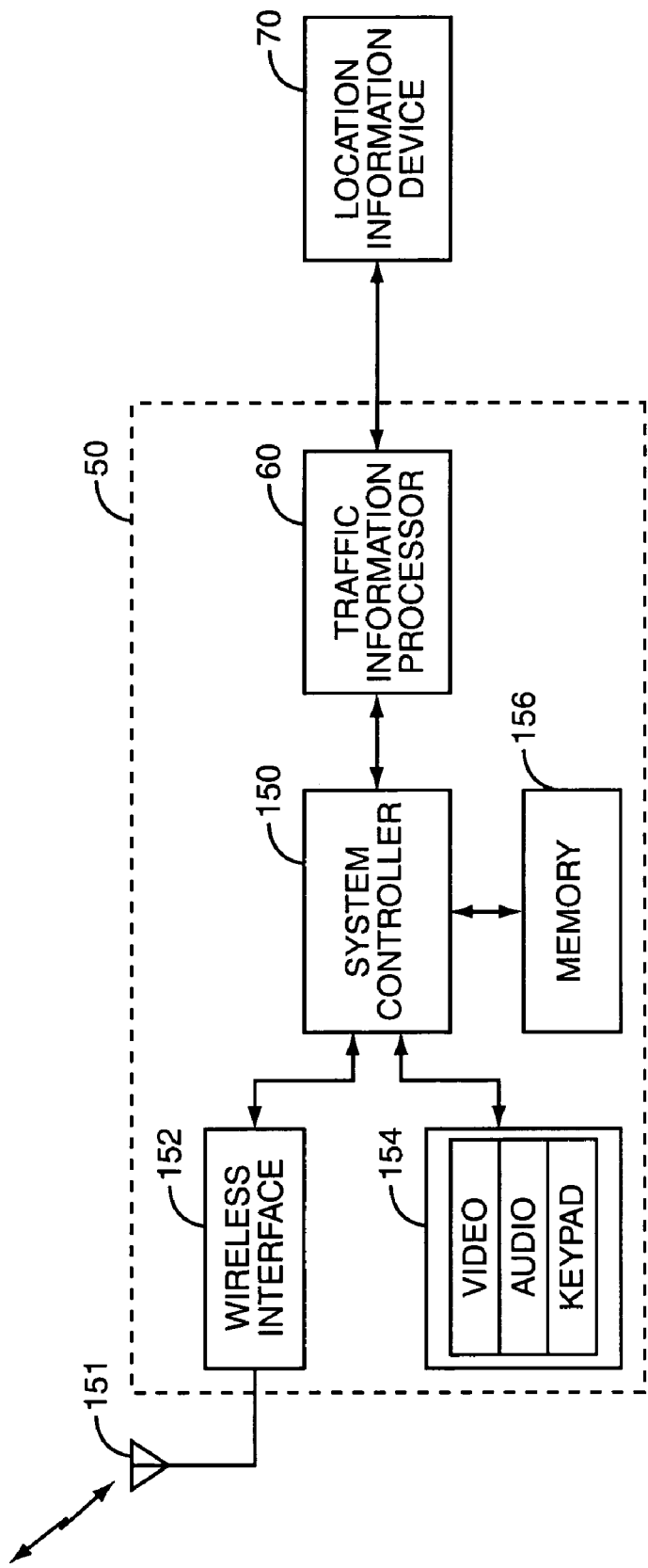
FIG. 4 illustrates an alternative embodiment for the wireless communications device of FIG. 2.

Such navigational devices typically rely on the global positioning system (GPS), and are oftentimes found integrated with in-car navigation systems. Other locating technologies, such as LORAN or pseudolite-based location systems are known and may be configured to provide suitable location information for practicing the present invention. FIG. 4 illustrates an example of such a combined system, wherein the mobile communications device 50 includes the traffic information processor 60 and an associated, external location information device 70, which provides location information to the traffic information processor 60. In some embodiments, the mobile terminal 50 may incorporate the location information device 70 (e.g., the mobile terminal 50 may include a GPS system).

Alternatively, the present invention may be practiced in an embodiment that does not rely on integrating a traffic information processor 60, or its functional equivalent thereof, within the mobile terminal 50. For example, the wireless communications network 40 may cooperate with the mobile terminals 50 to maintain a current location for all associated mobile terminals 50 and periodically report such information to the traffic information server 30, where detailed travel patterns may be developed for individual mobile terminals 50. Thereafter, the traffic information server 30 identifies current most likely route and/or destination information for an individual mobile terminal 50 and forms the appropriate traffic information database query. After querying the traffic information database 20, the traffic information server 30 transmits the pertinent traffic condition information back to the individual mobile terminal 50. Thus, in this embodiment, the bulk of the traffic information processing and route pattern processing is performed in the traffic information server 30. Of course, such processing may be performed in whole or in part using various elements of the wireless communications network 40.

In the above embodiment, the need for additional or specialized circuitry in the mobile terminals 50 is eliminated. Minor software or logic modifications may be implemented as needed to allow traffic information to be displayed by the mobile terminal 50 in a convenient format. Other software and/or hardware modifications may be required for certain types of mobile terminals 50 if it is desirable to have the mobile terminals 50 themselves track their current location. Otherwise, the communications network 40 may be adapted to track mobile device locations and provide such information to the traffic information server 30.

Figure 5:
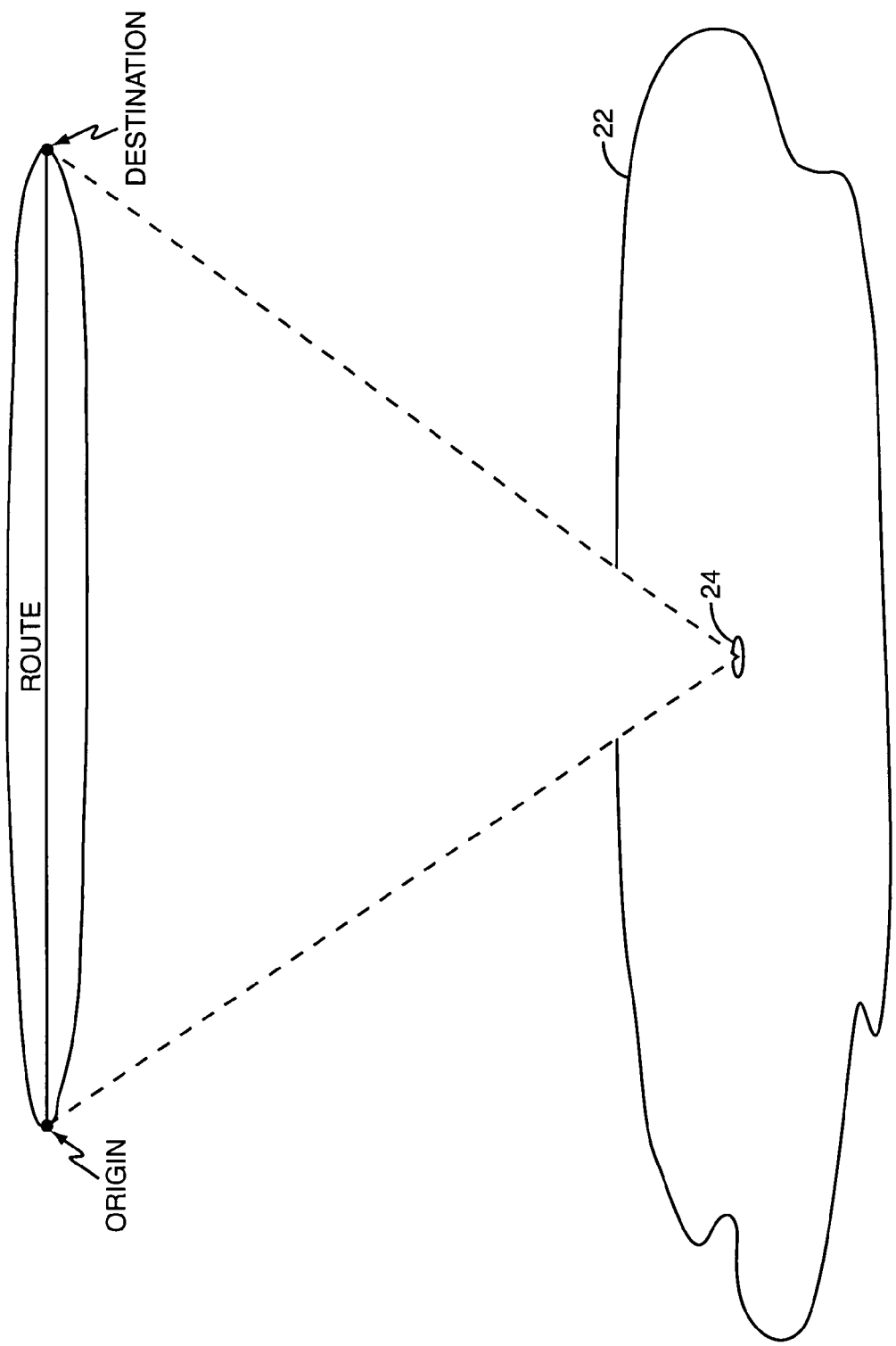
FIG. 5 illustrates a specific route of travel within a given geographic region.

FIG. 5 illustrates the significant advantage gained by motorists receiving route-specific traffic information. A typical traffic information database 20 may comprise real-time traffic information for a significant geographic region 22, yet a typical motorist operating a vehicle within the geographic region 22 is oftentimes interested only in traffic information relevant to their specific route 24. Existing systems recognize in limited fashion the dramatic benefits gained by providing route-specific information to a given motorist, but lack the convenience and safety associated with forming automatic route queries based on learned travel routes.

While a specific route is preferably based on one or more road segments—specific sections of roads on which the given motorist travels for a given route—the present invention is flexible in this regard. For example, the traffic information server 30 may correlate geographic position information for the mobile terminal 50 with an available street information database or with other available roadway information. Such roadway information may be part of the traffic information database 20, or may be stored separately. In other variations, the mobile terminal 50 may include or have access to street information, either through the traffic information processor 60 or the associated navigational device 70. In such embodiments, the mobile terminal 50 may determine street locations based on geographic position information. Thus, learned routes of travel may be stored in terms of geographic data, for later conversion to route-based street information. Alternatively, learned routes of travel may be stored in terms of street-based data, with the position-to-street correlation performed essentially anywhere in the traffic information system 10.

U.S. Pat. No. 5,808,566 to Behr, et al. discloses an example of an electronic navigation system that adopts a model wherein remote units can contact a centralized system for route guidance and other information, and is incorporated herein by reference. The Behr patent discloses an advantageous approach for reducing the amount of map or route data that needs to be transferred from a centralized system to remote units for display based on the use of tokenized forms representing "maneuver arms" or specific route segments.

While the specific approach to determining mobile terminal 50 location in the context of the present invention is not critical, it may be helpful to understand existing location techniques with the obvious qualifier that the present invention may be practiced with any of these or other techniques, depending upon specific performance needs, and time or cost constraints.

Enhanced Observed Time Difference (E-OTD) uses signals received at a mobile terminal 50 from at least three wireless base stations in combination with a location measurement unit to determine handset location based on arrival time differences for the signals at the different base stations 42. In contrast, Time of Arrival Systems (TOA) can use the arrival time difference between signals received from a mobile terminal 42 at different base stations 42 to determine handset location. Other variations exist, including systems that use antenna arrays to determine signal direction. These and other techniques readily understood by those skilled in the art allow the locations of mobile terminals 50 to be estimated within meters of their actual locations.

Figure 6:
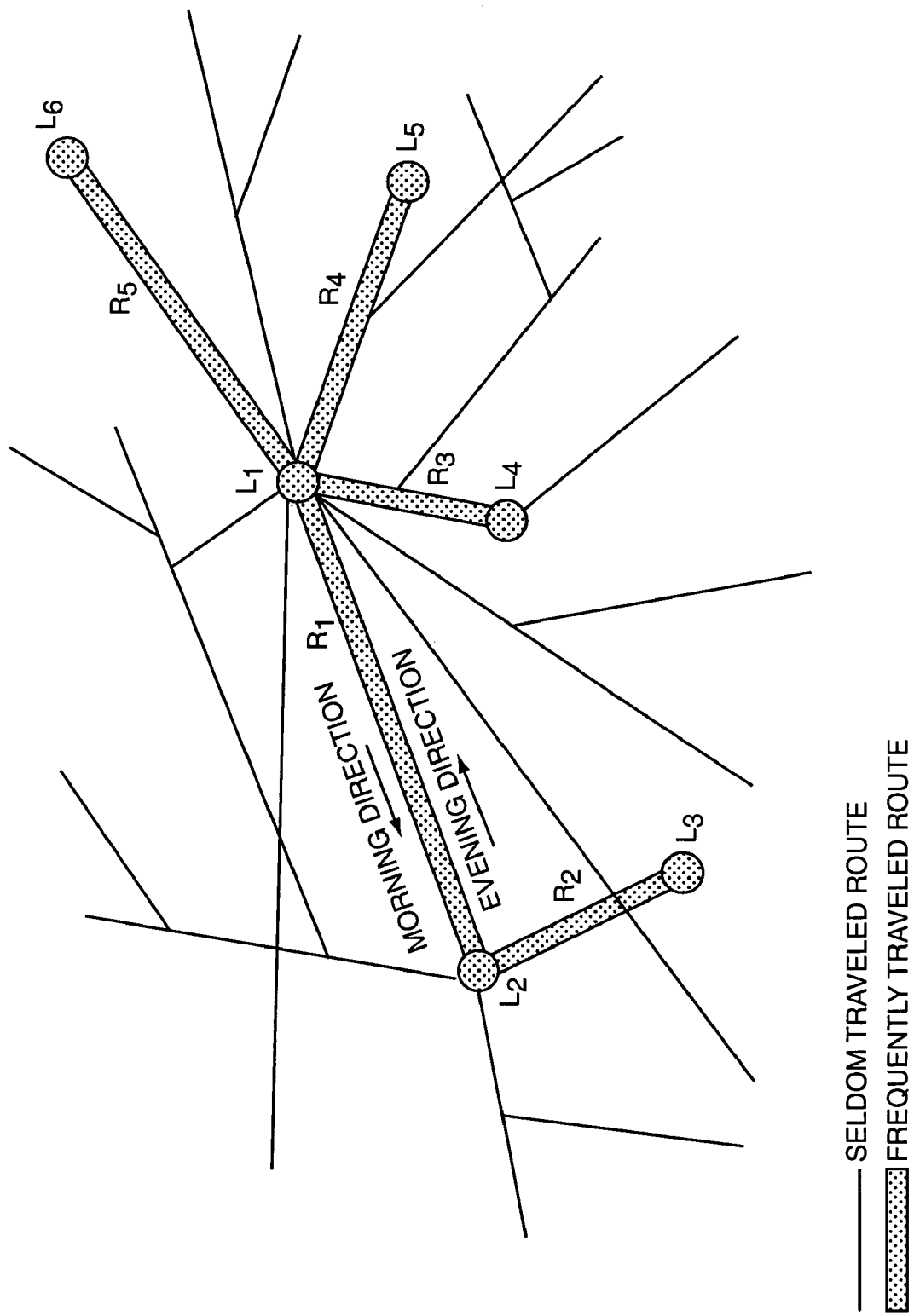
FIG. 6 graphically illustrates exemplary learned routes of travel and associated destinations.

FIG. 6 provides a graphical illustration of how a mobile terminal 50 in accordance with the present invention may be used to learn commonly traveled routes and associated destinations. Travel patterns for a hypothetical vehicle operator are depicted and include routes R1–R5 interconnecting locations L1–L6. Note that while the routes R1–R5 appear as straight lines symbolically, each route may include any number of actual road and street segments.

The illustration of FIG. 6 assumes that an operator of a given mobile terminal 50 carries the mobile terminal 50 at least intermittently in an associated vehicle 14 over a period of time, which may be hours, days, or weeks. Single lines indicate less frequently traveled routes for the associated vehicle, while the heavy, filled lines represent routes that are frequently traveled.

By periodically monitoring and recording the location of the mobile terminal over time, the traffic information system 10 learns the most frequently traveled routes for a given user associated with a given mobile terminal 50. The mobile terminal 50, the wireless communications network 40, the traffic information server 30, the external location information device 70, or any combination thereof may determine location for the mobile terminal. Location data may be recorded by the mobile terminal 50, and the traffic information processor 60 may coordinate some or all of this functionality. As an alternative, location data may be recorded in the traffic information server 30, or within the wireless communications network 40. In cases where the location data is recorded in the mobile terminal 50, this data may be sent, compressed or otherwise, to the wireless communications network 40 and traffic information server 30 for processing. Of course, the traffic information processor 60 may be adapted to process the recorded location data itself.

As illustrated, the given vehicle operator frequently travels from location L1 to location L2 along route R1. Based on tracking time-of-day information in conjunction with position data, it appears that for route R1 the morning direction of travel is most frequently from L1 to L2, while the evening direction of travel is most often from L2 to L1. Similar information may be learned for the other routes and locations R2–R5 and L3–L6, respectively.

Any number of routes may be learned for a given vehicle operator, and these may be developed at any level of time and position resolution. Obviously, greater position resolution and more frequent position tracking can result in the development of more detailed learned route information. For any particular implementation of the present invention, memory and processing requirements will be balanced against the desired level of travel route detail.

In some embodiments of the present invention, the traffic information system 10 may record a sequence of locations in response to specific user commands. For example, the user of the mobile terminal 50 may command, via the mobile terminal, the traffic information system 10 to begin recording mobile terminal locations at the outset of travel along a given route. At the conclusion of travel along the given route, the user may command the traffic information system 10 to stop recording locations of the mobile terminal 50. In this mode of operation, the user essentially "forces" the traffic information system 10 into a learn mode by controlling the recordation of a specific sequence of locations corresponding to a travel route of their choice. This technique represents a convenient way of quickly learning one or more travel routes for the user.

There are many variations on how travel records may be developed, and how they may be processed to learn routes of travel for the users of mobile terminals 50. Those skilled in the art will readily appreciate the many statistical processing techniques useful for filtering data sets to reveal patterns of repeating data. All such recordation and processing techniques are contemplated by the present invention. However, the traffic information system 10 preferably uses some form of weighted averaging technique to process recorded time and location information to learn traveled routes, associated destinations, and likely times of travel. As noted, the present invention is flexible as regards recording mobile terminal locations and processing this and related information to learn routes. Individual elements in the traffic information system 10, or any combination thereof may support these and other features of the present invention.

Expanded alternatives and supplemental techniques exist for learning or recognizing routes of travel based on recorded location information. For example, the act of sequentially recording locations imparts a basic relationship between successive locations that may be exploited to develop associations between groups of locations that correspond to a specific route or routes. Other data may be recorded with the location data, such as time of day, possibly with date information, to support more sophisticated location record processing.

For example, having location information with corresponding time-at-location data allows the traffic information system 10 to identify most likely times of travel for a given route. This data can then be used to predict when a given user is traveling or is about to travel on a given learned route. Destination information and directions of travel can be derived from the location data and similarly used to predict a most likely destination for a given learned route for a given current time, or for a given current location of the mobile terminal 50. Those skilled in the art will readily appreciate the substantial opportunity for identifying associations between recorded locations, and for deriving additional travel details from the recorded location data.

As noted above, time of day information is helpful because, for example, the traffic information system 10 (e.g., the traffic information server 30 or the traffic information processor 60) may use a current time to infer a direction of travel along one of the learned routes. As illustrated in FIG.

6, data collected for route R1 indicated that morning travel along R1 is most likely in the direction of L2, while evening travel along R1 is most likely in the direction of L1.

When no statistically meaningful data are available for a current time while traveling a given learned route, some embodiments of the present invention may elect to provide traffic information relevant to the most likely destination associated with the given route based on direction of travel, or possibly other data associated with the learned route. Alternatively, the user may be presented with a convenient way to select one from a set of likely destinations associated with the given route. Also, the traffic information system 10 may provide the user of a given mobile terminal 50 that is at a current location that does not correspond to any learned routes with traffic information relevant to the current location.

In other embodiments, the traffic information system (e.g., the traffic information server 30 or traffic information processor 60) may simply determine a direction of travel based on successive measurements of location. In both cases, direction of travel allows the traffic information system 10 to formulate a traffic information query that requests traffic information pertinent to the most likely route of travel—e.g., southbound versus northbound. Optionally, the traffic information system 10 may identify a most likely destination for a given learned route being traveled based on direction of travel and provide pertinent traffic information.

Figure 7:
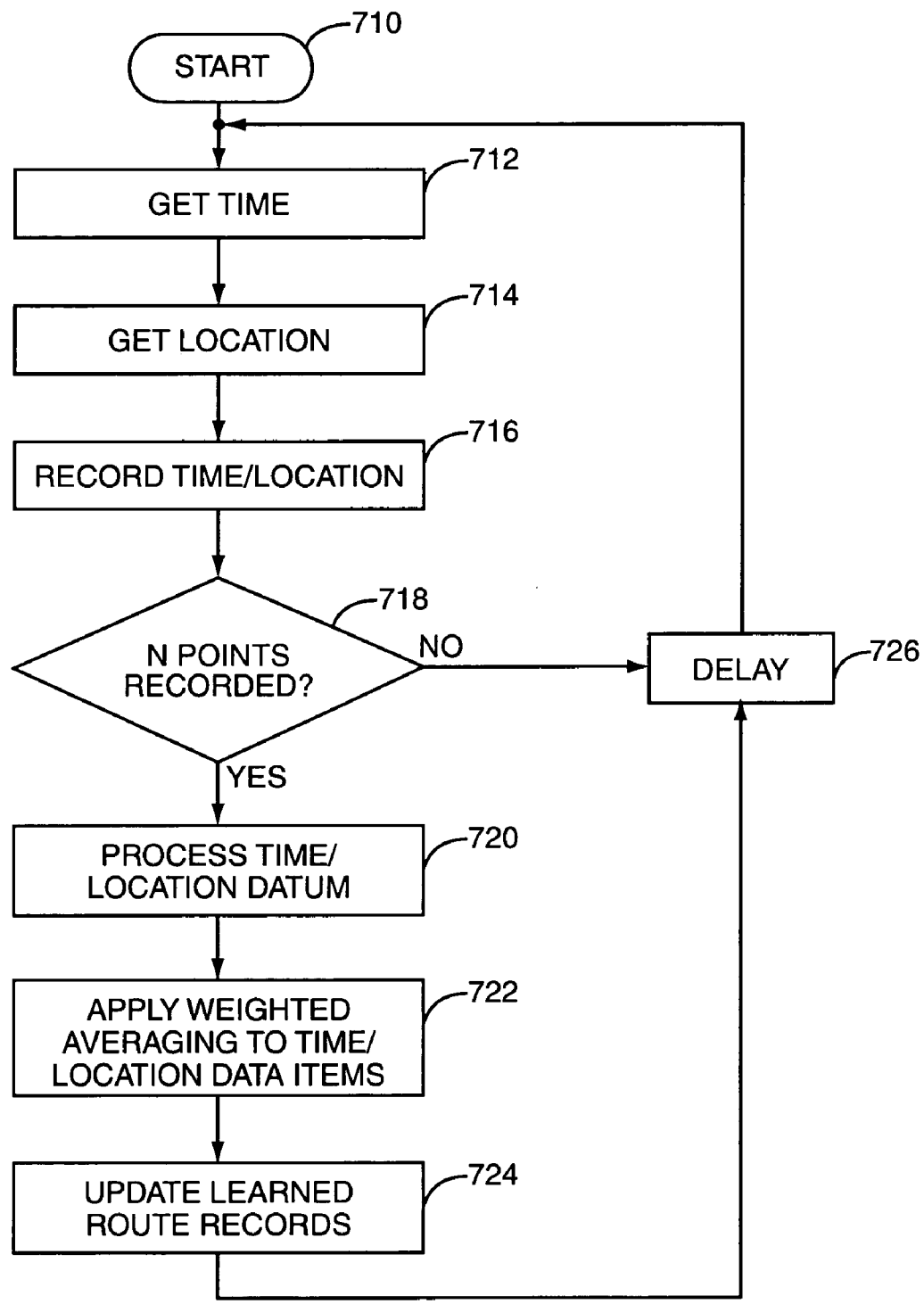
FIG. 7 is a simplified logic diagram depicting an exemplary technique for learning travel routes in accordance with the present invention.

FIG. 7 provides a simplified logic flow diagram illustrating how commonly traveled routes may be learned over time. While FIG. 7 presents such logic in the context of the mobile terminal 50, it should be understood that such functionality may be provided elsewhere in the traffic information system 10. The mobile terminal 50 begins operation (block 710) by optionally getting a current time (block 712) and a current location (block 714). As noted, the traffic information processor 60 may obtain time information using a real-time clock included within its circuitry or within the circuitry of the mobile terminal 50, or may obtain time information from the associated wireless communications network, or may use other techniques for obtaining a current time, such as accessing other in-vehicle systems.

Similarly, the traffic information processor 60 may use received signal strength or received signal timing for signals received from the associated wireless communications network 40 to determine a current location. Alternatively, the wireless communications network 40 (or associated processing systems) may use signals received from the mobile terminal 50 to determine current location information. As a further alternative, the traffic information processor 60 may receive current location information from another in-vehicle system, such as a GPS navigation system.

Location information may be recorded as absolute or relative geographic positions, or may be recorded in terms of street location with or without corresponding geographic locators. Further, data reduction techniques may be applied to recorded data to minimize memory requirements.

Current time and location information is recorded (block 716) in memory comprising a portion of the traffic information processor 60, or alternately, this information is stored within memory circuits 156 comprising a portion of the mobile terminal 50. Because frequently traveled routes are recognizable by accumulating location data and perhaps time information over a period of time, it is preferable and more computationally efficient to accumulate a given number of time and location values (points) before processing this data to determine or update commonly traveled route information. If fewer than N time/location points have been accumulated (block 718), processing continues to a delay function (block 726) before returning to time and location recordation functions (block 712).

The delay (block 726) may be programmable or may be adaptable based on a distance delta between successively determined locations (block 714). For example, the traffic information processor 60 may record fewer time/location points during a given period of time when there is little change in successive locations, and may record points more often when location is changing rapidly.

If N time/location points have been recorded (block 718), the time/location points are processed in preparation for determining or updating commonly traveled route information (block 720). Such processing is dependent upon the particular algorithm chosen for route learning, but may include developing data histograms where points within a certain time and location range are divided into ordered subgroups, or may include imposing a time and location sort order on the recorded data. Thereafter, traffic information processor 60 may apply any number of processing algorithms to the data, such as using weighted averaging techniques to establish route relationships intrinsic in the recorded data (block 722).

However, it should be understood that any data processing technique capable of revealing travel patterns in the recorded data is within the scope of the present invention. Such techniques may be extended to include neural network processing algorithms, or other sophisticated pattern recognition techniques.

Once the travel records have been processed (block 722), commonly traveled route and associated destination records are updated (block 724) and processing continues for subsequent collection of new time and location data (block 712) after a suitable delay (block 726). Note that this operating logic may be a part of a larger, more complex software program, and may represent background operations that are performed concurrently with other operating tasks of the traffic information processor 60, or the mobile terminal 50.

Figure 8:
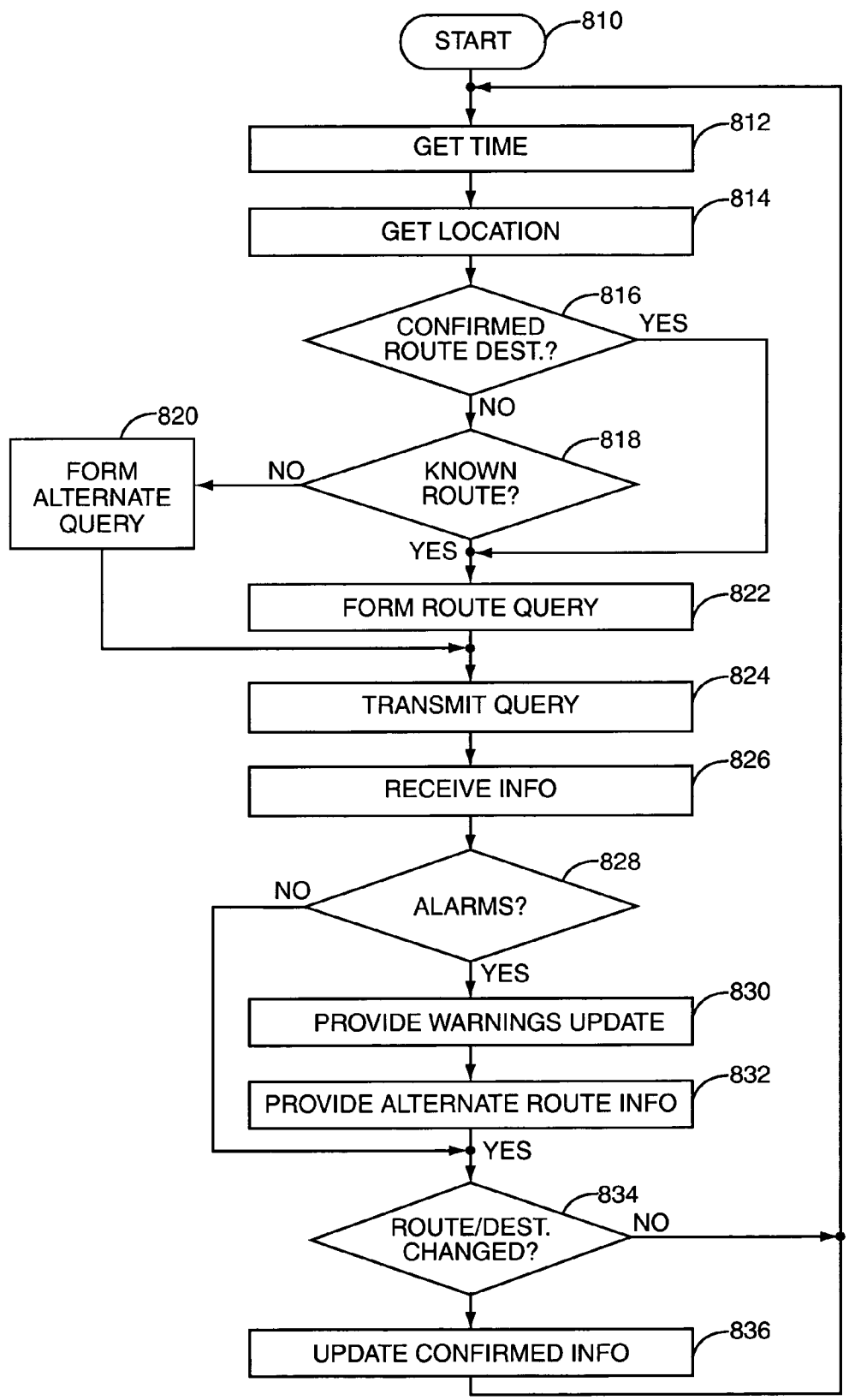
FIG. 8 is a simplified logic diagram depicting an exemplary technique for providing travel information based on current parameters and learned routes in accordance with the present invention.

FIG. 8 illustrates an embodiment of the present invention from the perspective of the mobile terminal 50, and assumes that at least one learned route and associated information for a given mobile terminal 50 is available. Note that some or all of the functionality illustrated in FIG. 8 may be assumed by the traffic information server 30, or in other elements of the traffic information system 10.

Operation begins (block 810) with the mobile terminal 50 getting a current time (block 812) and a current location (block 814). Time may be obtained in any number of ways, and may rely on a real-time clock included within the mobile terminal 50, may be obtained from the communications network 40 associated with the mobile terminal 50, or the traffic information processor 60 may itself obtain time information.

Location information is determined by or supplied to the traffic information processor 60 using any of the techniques disclosed herein. If a particular route of travel has a known likely destination (block 816), processing may skip ahead (block 822). If no route has been confirmed, the traffic information processor compares the current location with learned route information to determine if the current location is on a known route (block 818). If so, the traffic information processor 60 uses the current location on the known route to form a route query for transmittal to the traffic information server 30 (block 822).

Note that time of day information may be used to further refine the query to include a request for traffic information that is specifically for the most likely destination associated with the current travel route. If the current location is not on a recorded travel route, the traffic information processor 60 may form an alternate query (block 820) for traffic information pertinent to the present location. Exemplary embodiments of the traffic information processor 60 allow the user to configure the mobile terminal 50 to set configuration items such as default radius of query for situations in which the traffic information processor 60 cannot correlate the present location with a recorded route of travel.

The traffic information processor 60 cooperates with the mobile terminal 50 to transmit the query to the communications controller 30 via the wireless communications network 40 (block 824). The traffic information server 30 processes the received query and uses this information to access the continuously updated traffic information database 20. Information retrieved from the traffic information database 20 pertinent to the query is transmitted through the wireless communications network 40 and associated communications tower 12 back to the mobile terminal 50 and its associated traffic information processor 60 (block 826).

The mobile terminal 50 receives this information and transfers it to the traffic information processor 60, where it is processed to determine if there are any route specific traffic problems indicated by the received information (block 828). If there are no alarm conditions, processing skips ahead (block 834), otherwise the traffic information processor 60 causes the mobile terminal 50 to provide appropriate warnings to the operator of the vehicle associated with the mobile terminal 50 (block 830). These warnings may be new, or reflect updated warnings pending from earlier traffic problems.

The traffic information server 30 may use information contained in the traffic information database 20 to determine whether or not the traffic information processor 30 should provide alternate route information to the operator of the vehicle associated with the mobile terminal 50. Alternately, the decision to provide alternate route information may be made by the traffic information processor 60 based on data received from the traffic information database through the traffic information server 30 and the associated wireless communications network 40.

As a further alternative, some embodiments of the present invention provide traffic information specific to a predicted route of travel. In such embodiments, a current parameter, such as time-of-day or position, is used to predict a most likely route of travel based on learned route information. This allows the traffic information system 10 to automatically provide a given motorist with relevant traffic information. As an example, the traffic information system 10 could provide the given motorist's mobile terminal 50 with traffic information specific to their morning work commute every morning.

Of course, current position may be used in much the same way. That is, the traffic information system 10 could identify the most likely route of travel that will be undertaken by a given motorist based on their current position. As with other features of the present invention, these techniques may be combined for increasing sophistication. For example, calendar information may be considered as well. As such, the traffic information system could predict a different route of travel on a weekend morning, as opposed to a weekday morning.

Further, substantial opportunities for sophistication exist with respect to how and when the system of the present invention provides vehicle operators with traffic warnings and alternate route guidance. For example, a mobile terminal 50 including a traffic information processor 60 may be configured by a particular vehicle operator to provide alternate route guidance only when the traffic information server 30 returns information to the mobile terminal 50 indicating that delays beyond a programmed maximum time exist for a current route of travel. Other customizable warning flags may be defined and configured for and by users of the traffic information system 10.

Regardless of whether the decision to provide alternate route information is determined by the traffic information server 30, or the traffic information processor 60 within the mobile terminal 50, the user interface 154 of the mobile terminal 50 is used to provide the vehicle operator with alternate route information when necessary (block 832).

As noted, information may comprise both auditory and visual information, and may be keyed to the specific traffic conditions indicated by the information returned to the traffic information processor 60 by the traffic information server 30. The manner in which information is presented to the vehicle operator may further the safety and convenience aspects of the present invention. For example, a specific type of beep or tone may be emitted by the mobile terminal 50 in response to minor indications of traffic problems along the route of travel, while a different, perhaps stronger, tone or beep may be used to indicate more serious traffic congestion, or the need to consult the visual display included in the user interface 154 of the mobile terminal 50 for alternate route guidance.

In other embodiments, the mobile terminal 50 may interface with other in-car systems, such as navigation systems, to provide traffic information and alternate route guidance information using these associated in-car systems. Vehicle operators may configure various aspects of operation of the mobile terminal 50 and associated traffic information processor 60 to suit individual needs.

If the route destination has not changed (block 834), processing returns after some programmed delay for continuation of the basic processing loop (block 812). If the route destination has changed (block 834), such as when an operator indicates acceptance of an alternate route of travel, the traffic information processor 60 may perform a subsequent query of the traffic information server 30 to confirm travel conditions along the changed route of travel (block 836), and then processing restarts after a suitable program delay (block 812). Importantly, FIG. 8 simply illustrates one embodiment of the present invention, and is not intended to limit the many variations and enhancements available with the system of the present invention.

Figure 9:
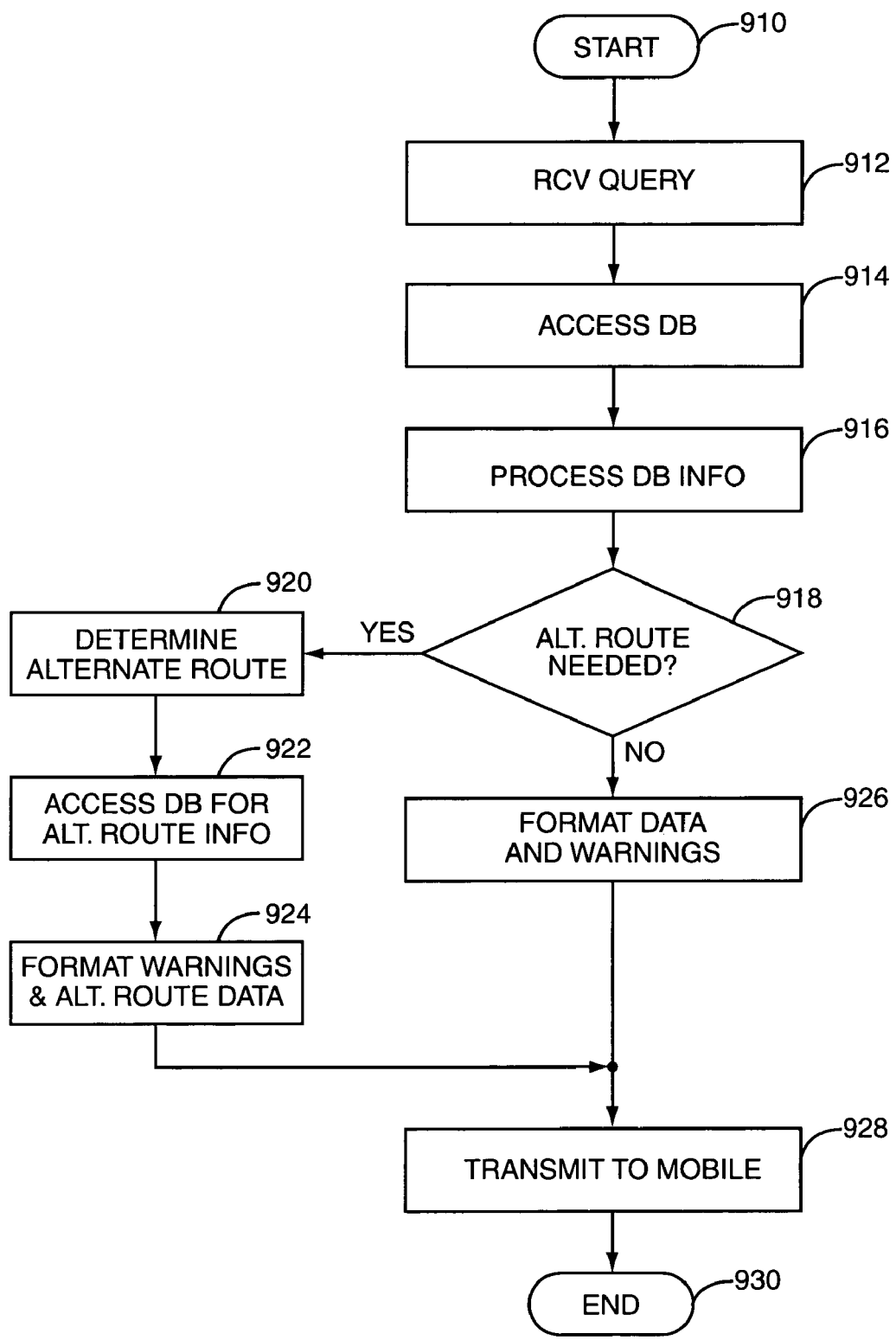
FIG. 9 is a simplified logic diagram depicting an exemplary technique for interfacing with a traffic information database in accordance with the present invention.

FIG. 9 illustrates exemplary operating logic for the traffic information server 30 in response to receiving a traffic information query from a mobile terminal 50. Operation begins (block 910) with the traffic information server 30 receiving a traffic information query from a mobile terminal 50 through the wireless communications network 40 (block 912). The traffic information server 30 uses the query information to access the traffic information database 20 (block 914).

Information retrieved from the traffic information database 20 is processed by the traffic information server 30 to determine pertinent route and destination traffic information (block 916). This exemplary processing logic represents only one of a number of choices as to how the processing burden associated with determining actual traffic conditions is shared between the traffic information server 30 and the traffic information processor 60 within the polling mobile terminal 50. In some implementations, it may be advantageous to perform the bulk of traffic information processing in the traffic information server 30, while in other systems, there may be advantages in performing much of this processing in the traffic information processor 60 within the mobile terminal 50.

If information retrieved from the traffic information database 20 indicates that there are undesirable traffic conditions at one or more points along the route, the traffic information server 30 assesses the type and severity of traffic conditions indicated by the information to determine whether or not it is necessary to compute an alternate route (block 918). This decision represents opportunity for individual users—that is, the vehicle operators associated with the various mobile terminals 50—to customize the system such that their individual needs and desires are met.

An individual user of the traffic information system of the present invention may pre-configure the system to compute alternate route information if any point along their intended route indicates a traffic delay that exceeds their maximum tolerable delay time. Other opportunities for customization may require the traffic information server 30 to create and maintain a user information database that could, for example, contained preferred alternate route information for certain commonly traveled routes, as well as other default settings for how and when individualized traffic alarms should be set in response to current traffic conditions indicated by the traffic information database 20.

If the current traffic conditions and user settings indicate the need to compute an alternate route, the traffic information server 30 computes an alternate route for the destination indicated in the original query received from the mobile terminal 50 (block 920). Note that in some cases, the mobile terminal 50 will not be able to include a destination in its traffic information query, and in this case, the traffic information server 30 may simply respond to the query by providing traffic information relevant to the current location of the mobile terminal 50.

Once the traffic information server 30 computes an alternate route, it preferably accesses the traffic information database 20 to query for traffic information relevant to the alternate route (block 922). If the alternate route has significant traffic problems, the traffic information server 30 may iteratively compute the best possible alternate route given current traffic conditions, or may simply select the least objectionable alternate route in terms of time and distance. In any case, the traffic information server 30 formats the appropriate warning and alternate route information data (block 924) for subsequent transmission to the mobile terminal 50 through the wireless communications network 40 and associated communications tower 12 (block 928). If computation of an alternate route is not wanted (block 918), the traffic information server 30 simply formats traffic information and traffic warning data (block 926) for subsequent transmission to the mobile terminal 50 through the wireless communications network 40 and associated communications tower 12 (block 928). After transmitting traffic information to the querying mobile terminal 50, processing ends with respect to the current query (block 930).

As noted earlier, the present invention enhances the safety and convenience of vehicle operators by retrieving route-specific traffic information from a continuously updated traffic information database using common mobile terminals 50, such as cellular telephones or PDAs. Using current time and location information to infer the most likely route and associated destination information based on learned travel patterns minimizes the necessary interaction between the mobile terminal 50 and the vehicle operator, thus enhancing both safety and convenience. Some embodiments of the present invention may, of course, support these types of automatic route queries, as well as full interactive route and destination queries where the vehicle operator explicitly chooses a desired route or destination.

Further, the mobile terminal 50 may itself determine position information, may receive position information from an associated wireless network, or may receive position information from an associated navigation system. These and other variations are within both the scope and spirit of the present invention, and the foregoing description should be understood as exemplary and not limiting. Indeed, the present invention is limited only by the scope of the claims, and their reasonable equivalents, included herewith.

What is claimed is:

1. A method comprising:
   determining if travel on a learned route by a user is likely by determining if a current time corresponds to at least one travel time associated with the learned route;
   requesting, through a mobile terminal, traffic information pertaining to the learned route when travel on the learned route is likely;
   delivering the traffic information via the mobile terminal to the user; and
   predicting a most likely destination from one or more destinations associated with the learned route based on the current time and the at least one travel time associated with the learned route, wherein the most likely destination bears on the traffic information delivered to the user of the mobile terminal.

2. A method comprising:
   determining if travel on a learned route by a user is likely comprising:
      determining a location of the mobile terminal; and
      comparing the location of the mobile terminal with location information associated with the learned route to determine if travel on the learned route by the user is likely; and
   determining a direction of travel along the learned route based on determining successive locations of the mobile terminal for at least one interval of time;
   requesting, through a mobile terminal, traffic information pertaining to the learned route when travel on the learned route is likely; and
   delivering the traffic information via the mobile terminal to the user,
   wherein the direction of travel bears on the traffic information delivered to the user of the mobile terminal.

3. The method of claim 2 wherein at least one travel time is associated with the learned route and said step of determining if travel on a learned route by the user is likely comprises determining if a current time corresponds to the at least one travel time associated with the learned route and the location of the mobile terminal corresponds with the location information associated with the learned route.

4. A method comprising:
   determining if travel on a learned route by a user is likely;
   requesting, through a mobile terminal, traffic information pertaining to the learned route when travel on the learned route is likely; and
   delivering the traffic information via the mobile terminal to the user,
   wherein at least one destination is associated with the learned route and further comprising predicting a most likely destination as one of the at least one destinations associated with the learned route based on determining a direction of travel along the learned route, wherein the most likely destination bears on the traffic information provided to the user of the mobile terminal.

5. The method of claim 4 wherein said determining a direction of travel along the learned route comprises determining successive locations of the mobile terminal.

6. The method of claim 4 further comprising learning the learned route by:
   recording locations of the mobile terminal traveling along a traveled route; and
   processing the locations to define the learned route.

7. The method of claim 6 further comprising:
   receiving a first user command and performing said step of recording locations in response to the first user command; and
   receiving a second user command and performing said step of processing the locations to define the learned route in response to the second user command.

8. The method of claim 6 wherein said processing the locations to define the learned route comprises correlating the locations with roadway information to identify at least one road segment associated with the locations, and wherein the step of requesting traffic information pertaining to the learned route is based on requesting traffic information pertinent to the at least one road segment.

9. A method comprising:
   determining if travel on a learned route by a user is likely;
   requesting, through a mobile terminal, traffic information pertaining to the learned route when travel on the learned route is likely;
   delivering the traffic information via the mobile terminal to the user; and
   learning the learned route, wherein learning the learned route comprises:
      periodically recording data including at least a location of the mobile terminal over a period of time;
      processing the data to identify at least one group of associated ones of the locations; and
      defining at least one learned route as represented by the at least one group of associated ones of the locations.

10. The method of claim 9,
   wherein said processing the data comprises processing the data such that locations having a most frequent rate of occurrence in the data are identified, and wherein the locations having the most frequent rate of occurrence are associated based on a location value to form the at least one group of associated ones of the locations.

11. The method of claim 10 wherein said processing data to identify the locations having a most frequent rate of occurrence in the data comprises using a weighted averaging algorithm.

12. A method comprising:
   determining if travel on a learned route by a user is likely;
   requesting, through a mobile terminal, traffic information pertaining to the learned route when travel on the learned route is likely;
   accessing the traffic information pertinent to the learned route;
   delivering the traffic information via the mobile terminal to the user;
   learning the learned route by:
      periodically recording data including at least a location of the mobile terminal over a period of time;
      processing the data to identify at least one group of associated ones of the locations; and
      defining at least one learned route as represented by the at least one group of associated ones of the locations;
      recording time information in conjunction with the locations as part of the data;
      processing the time information in conjunction with the locations to identify at least one travel time associated with the at least one learned route; and
      processing the locations to determine a most likely direction of travel for the at least one travel time;
   wherein a current time and the most likely direction of travel bears on said step of accessing the traffic information pertinent to the learned route.

13. A method comprising:
   determining if travel on a learned route by a user is likely;
   requesting, through a mobile terminal, traffic information pertaining to the learned route when travel on the learned route is likely;
   accessing traffic information pertaining to the learned route;
   delivering the traffic information via the mobile terminal to the user;
   learning the learned route by:
      periodically recording data including at least a location of the mobile terminal over a period of time;
      processing the data to identify at least one group of associated ones of the locations; and
      defining at least one learned route as represented by the at least one group of associated ones of the locations;
   correlating the at least one group of associated ones of the locations with roadway information to identify at least one road segment associated with the at least one learned route; and
   wherein said step of accessing traffic information pertaining to the learned route is based on accessing traffic information pertinent to the at least one road segment.

14. The method of claim 13 further comprising processing the traffic information pertaining to the learned route to determine if an undesirable condition is indicated.

15. The method of claim 14 further comprising:
   requesting, through the mobile terminal, traffic information pertaining to an alternate route; and
   delivering the traffic information pertaining to the alternate route to the user of the mobile terminal if the undesirable condition is indicated.

16. The method of claim 14 further comprising receiving one or more user settings used to process the traffic information pertaining to the learned route.

17. A computer readable media comprising software for instructing a computer to:
   receive at least one location value representing a location of a user's cellular telephone;
   process the at least one location value to identify at least one group of associated locations representing at least one route of travel traveled by the user's cellular telephone; and
   query an associated traffic information database for traffic information, wherein the traffic information relates to information selected from a group consisting of: traffic congestion, accidents, traffic flow, traffic snarls, and construction.

18. The computer readable media of claim 17 for further instructing the computer to correlate the at least one group of associated locations with roadway information to form a learned route including at least one road segment.

19. The computer readable media of claim 18 wherein the query of the associated traffic information database for traffic information pertains to the learned route.

20. The computer readable media of claim 19 for further instructing the computer to determine if the traffic information pertaining to the learned route indicates an undesirable condition and if so to provide traffic information pertaining to an alternate route, said traffic information adapted to be delivered to the user's cellular telephone.

21. The computer readable media of claim 20 for further instructing the computer to determine the alternate route based on determining a most likely current destination for the user, wherein information representing the learned route includes information representing at least one destination associated with the learned route.

22. A computer readable media comprising software for instructing a cellular telephone to:
   periodically record data including at least a location of the cellular telephone;
   process the data to identify at least one group of associated locations representing a route of travel;
   defining at least one learned route of travel based on the at least one group of associated locations;
   request traffic information related to the at least one learned route of travel; and
   record time information in conjunction as part of the data periodically recorded and to further process the data to identify at least one travel time for each of the at least one learned routes, wherein the cellular telephone may compare a current time with the at least one travel times to predict whether or not a user is likely to travel on the learned route.

23. A computer readable media comprising software for instructing a cellular telephone to:
   periodically record data including at least a location of the cellular telephone;
   process the data to identify at least one group of associated locations representing a route of travel;
   defining at least one learned route of travel based on the at least one group of associated locations;
   request traffic information related to the at least one learned route of travel;
   process the data to identify at least one associated destination for each of the at least one learned routes; and
   determine a direction of travel for the user when the user is traveling along a given one of the at least one learned routes, and for further instructing the cellular telephone to predict a most likely destination for the given one of the at least one learned routes based on the direction of travel.

24. A computer readable media comprising software for instructing a cellular telephone to:
   periodically record data including at least a location of the cellular telephone;
   process the data to identify at least one group of associated locations representing a route of travel;
   defining at least one learned route of travel based on the at least one group of associated locations;
   request traffic information related to the at least one learned route of travel;
   begin periodically recording locations of the cellular telephone in response to a first user command;
   stop recording the data in response to a second user command; and
   process the data recorded between the first and second user commands to define a learned route.

25. A mobile terminal comprising:
   a wireless communications interface adapted to communicate with a remote communications network;
   a user interface adapted to provide information to a user of said mobile terminal and to receive control inputs from the user;
   system control logic adapted to control said wireless communications interface and said user interface; and
   traffic information logic adapted to form traffic information queries for transmission to the remote communications network, and process traffic information received from the wireless communications network in response to the traffic information queries for subsequent delivery to the user via said user interface;
   wherein said traffic information logic is adapted to record locations of the mobile terminal over at least one period of time, wherein the recorded locations facilitate learning one or more routes traveled by the user of said mobile terminal, and wherein the learning of one or more routes traveled by the user bears on the information included by the traffic information logic in forming at least some of the traffic information queries.

26. The mobile terminal of claim 25 wherein said traffic information logic is further adapted to process the locations recorded to identify at least one group of associated locations representing at least one traveled route, and further adapted to define the at least one traveled route as at least one learned route.

27. The mobile terminal of claim 25 wherein the traffic information logic translates the at least one learned route into at least one road segment based on correlating the locations in the corresponding at least one group of associated locations with roadway information.

28. The mobile terminal of claim 25 wherein said mobile terminal is adapted to receive the roadway information from a separate navigational system, wherein said navigational system is included with said mobile terminal in a vehicular environment associated with the user of the mobile terminal.

29. The mobile terminal of claim 25 wherein said mobile terminal is further adapted to receive the locations from a separate navigational system, wherein said navigational system is included with said mobile terminal in a vehicular environment associated with the user of the mobile terminal.

30. The mobile terminal of claim 25 wherein said mobile terminal is further adapted to receive the locations from an integral navigational system included in said mobile terminal.

31. The mobile terminal of claim 25 wherein said traffic information logic comprises a portion of said system control logic.

32. The mobile terminal of claim 25 further comprising a module interface and wherein said traffic information logic comprises a module adapted to interface with said module interface.

33. The mobile terminal of claim 32 wherein said module is removably interfaced with said module interface such that said traffic information logic may be removably attached to said mobile terminal.

34. A method comprising:
   determining if travel on a learned route by a user is likely;
   requesting, through a mobile terminal, traffic information pertaining to the learned route when travel on the learned route is likely; and
   delivering the traffic information via the mobile terminal to the user,
   wherein delivering traffic information via the mobile terminal to the user comprises delivering information relating to information selected from the group consisting of: traffic congestion, accidents, traffic flow, traffic snarls, and construction.

35. The mobile terminal of claim 25 wherein said traffic information logic forms traffic information queries requesting information relating to information selected from the group consisting of: traffic congestion, accidents, traffic flow, traffic snarls, and construction.

36. The traffic information system of claim 25 wherein said traffic information server adapted to provide traffic information provides traffic information relating to information selected from the group consisting of: traffic congestion, accidents, traffic flow, traffic snarls, and construction.

* * * * *